United States Patent
Thubert et al.

(10) Patent No.: US 12,468,619 B2
(45) Date of Patent: Nov. 11, 2025

(54) METHOD FOR ADJUSTING COMPUTING DEVICE BASED ON DATA FUSION BY OBTAINING OPERATIONAL HEALTH PERFORMANCE METRICS AND CONTEMPORANEOUS SITUATIONAL SENSOR DATA ASSOCIATED WITH THE SET OF DEVICES

(71) Applicant: Cisco Technology, Inc., San Jose, CA (US)

(72) Inventors: Pascal Thubert, Roquefort les Pins (FR); Leo Caldarola, Morrens (CH); Domenico Ficara, Essertines-sur-Yverdon (CH); Amine Choukir, Lausanne (CH); Giacomo Trifilo, Pully (CH); Lorenzo Granai, Crissier (CH)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 17/977,326

(22) Filed: Oct. 31, 2022

(65) Prior Publication Data

US 2024/0143478 A1 May 2, 2024

(51) Int. Cl.
*G06F 11/34* (2006.01)
(52) U.S. Cl.
CPC ................. *G06F 11/3495* (2013.01)
(58) Field of Classification Search
CPC .................................................. G06F 11/3495
See application file for complete search history.

(56) References Cited

U.S. PATENT DOCUMENTS

| | | | | |
|---|---|---|---|---|
| 9,738,382 | B2* | 8/2017 | Brulez | G06F 3/012 |
| 11,279,481 | B2* | 3/2022 | Burks | H04W 4/44 |
| 11,991,345 | B2* | 5/2024 | Oonishi | G02B 27/0172 |
| 2013/0196685 | A1 | 8/2013 | Griff et al. | |
| 2015/0358834 | A1 | 12/2015 | Cronin | |

(Continued)

FOREIGN PATENT DOCUMENTS

EP 2938117 A1 * 10/2015 ............ H04W 24/02

OTHER PUBLICATIONS

"Cisco DNA Assurance User Guide, Release 1.3", Chapter: Manage Intelligent Capture, Feb. 6, 2020, 19 pages, Cisco Systems, Inc.

(Continued)

*Primary Examiner* — Tammara R Peyton
(74) *Attorney, Agent, or Firm* — Lee & Hayes, P.C.; James M. Behmke

(57) ABSTRACT

In one embodiment, an illustrative method herein may comprise: obtaining, by a process, operational performance metrics associated with one or more devices performing an operation and contemporaneous situational sensor data associated with the one or more devices performing the operation; establishing, by the process, a correlation between a health of the operational performance metrics and the contemporaneous situational sensor data for the one or more devices while performing the operation; determining, by the process, an adjustment to increase the health of the operational performance metrics for a particular device of the one or more devices based on the correlation; and communicating, by the process, the adjustment to a receiving device to facilitate adjusting of the particular device.

20 Claims, 5 Drawing Sheets

(56) References Cited

U.S. PATENT DOCUMENTS

2017/0019799 A1* 1/2017 Djordjevic ........... G08G 5/0043
2018/0132060 A1 5/2018 Dhulipalla et al.
2018/0352386 A1 12/2018 Gunasekara et al.
2019/0028909 A1 1/2019 Mermoud et al.

OTHER PUBLICATIONS

S. Fang, et al., "EyeFi: Fast Human Identification Through Vision and WiFi-based Trajectory Matching," 2020 16th International Conference on Distributed Computing in Sensor Systems (DCOSS), 2020, pp. 59-68.
S. Fang, et al., "Fusing wifi and camera for fast motion tracking and person identification: demo abstract", SenSys '20: Proceedings of the 18th Conference on Embedded Networked Sensor Systems, Nov. 2020, pp. 617-618.
S. Ayub, et al. "A Sensor Fusion Method for Smart phone Orientation Estimation", ISBN: 978-1-902560-26-7, 2012 PGNet, 6 pages.http://www.cms.livjm.ac.uk/pgnet2012/Proceedings/Papers/1569603133.pdf.
D. Mahmood et al., "Data Fusion for Orientation Sensing in Wireless Body Area Sensor Networks using Smart Phones", 2015, 10.1016/B978-0-12-803663-1.00008-5, 22 pages. https://www.researchgate.net/publication/284332668_Data_Fusion_for_Orientation_Sensing_in_Wireless_Body_Area_Sensor_Networks_using_Smart_Phones.
Boris Smus, "Sensor fusion and motion prediction", https://smus.com/sensor-fusion-prediction-webvr/, Nov. 5, 2015, 12 pages.
"Cisco Intelligent Capture Deployment Guide", Jun. 14, 2021, 69 pages, Cisco Systems, Inc.

* cited by examiner

METHOD FOR ADJUSTING COMPUTING DEVICE BASED ON DATA FUSION BY OBTAINING OPERATIONAL HEALTH PERFORMANCE METRICS AND CONTEMPORANEOUS SITUATIONAL SENSOR DATA ASSOCIATED WITH THE SET OF DEVICES

TECHNICAL FIELD

The present disclosure relates generally to computer systems, and, more particularly, to device adjustments based on performance and sensor data.

BACKGROUND

Computing devices are an integral part of daily life. They are relied upon to perform a variety of computational operations regularly and reliably. The devices are equipped with ever increasing capabilities and complexity to meet a seemingly endless demand to perform more computational operations, in more diverse environments and situations, and with increased performance demands.

Many of these operations involve data communication across a data communications network. As such, the ability of a computing device to send and/or receive data using a data communication network can be a significant factor in a computing device meeting the performance demands of a user and/or an application. While some tools exist for monitoring the performance of network infrastructure, these tools are completely blind to a host of additional factors that can negatively impact the operation of a computing device. Often, these additional factors, including various environmental, positional, data network, and device operation factors, may impede the performance of a computing device regardless of the operations of the network infrastructure. As a result, a computing device may deliver a suboptimal performance and/or fails to meet a performance demand in a manner that goes completely unnoticed and/or unaddressed by the presently available network monitoring tools.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein may comprise: obtaining, by a process, operational performance metrics associated with one or more devices performing an operation and contemporaneous situational sensor data associated with the one or more devices performing the operation; establishing, by the process, a correlation between a health of the operational performance metrics and the contemporaneous situational sensor data for the one or more devices while performing the operation; determining, by the process, an adjustment to increase the health of the operational performance metrics for a particular device of the one or more devices based on the correlation; and communicating, by the process, the adjustment to a receiving device to facilitate adjusting of the particular device.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
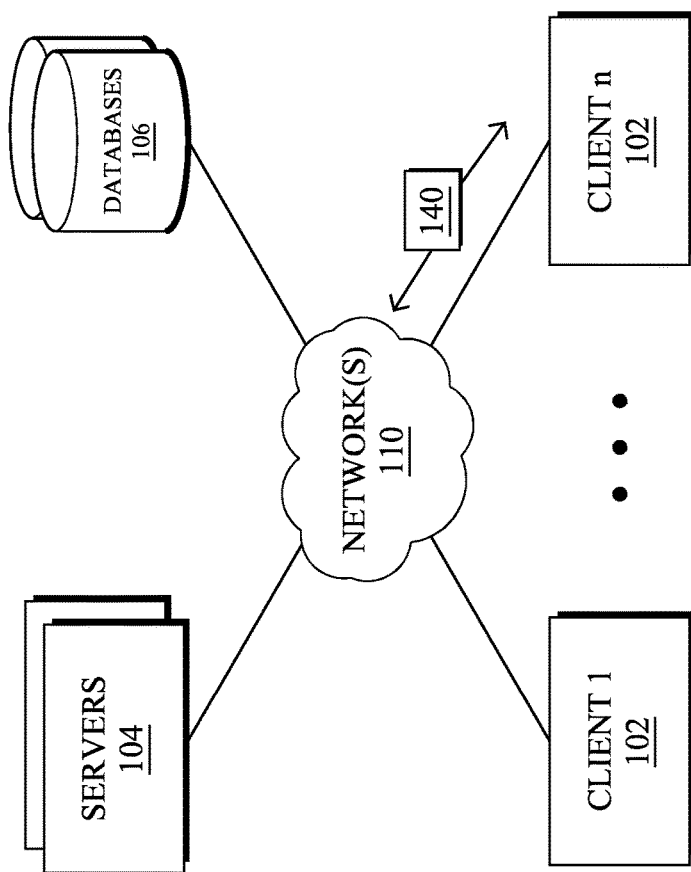
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
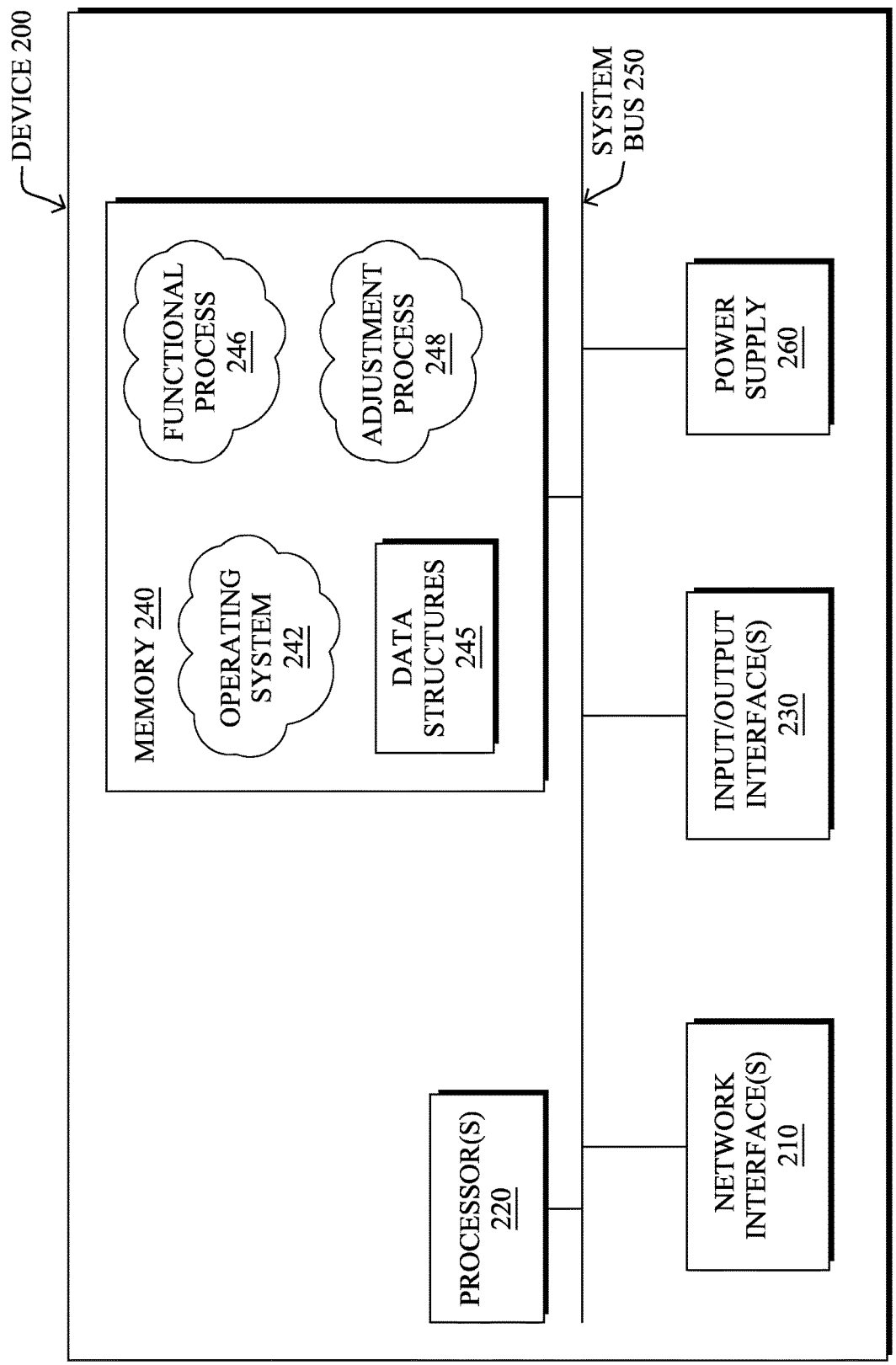
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "adjustment" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Device Adjustment Based on Performance and Sensor Data—

As noted above, a variety of factors can influence the performance of a computing device. For example, the orientation, location, settings, environmental conditions, situational data network configuration, etc. can all have an impact on the computing device's ability to perform a computational operation. In many instances, data communication can play an important role in the performance of a computing device, and the aforementioned factors can impact the ability of the computing device to send, receive, etc. data over a data communications network.

Frequently, data communications networks operate using wireless technologies to communicate data. Presently, identifying and/or troubleshooting performance issues in data communications is limited to the analysis of wireless telemetry data collected via a data communications network. While this telemetry data can provide network administrators insights about wireless service quality with respect to the operations of the data communications network infrastructure itself, it presently does not extend to cover identification and/or resolution of additional factors such as the orientation, location, settings, environmental conditions, situational data network configuration, etc. factors discussed above.

For example, analytics platforms are presently used to collect and deliver network insights to optimize network performance. These platforms are focused on Institute of Electrical and Electronics Engineers (IEEE) 802 protocols for implementing computer communication and covers radio frequency spectrum management, access point (AP) statistics, client-packet capture, anomaly detection, etc. However, these platforms do not provide insight about, for instance, data stream quality for client computing devices and they do not cover other wireless technologies that might be present in a client computing device. In short, these platforms are largely blind to the performance experience at the client computing device and operate without any cooperation from one or more client computing devices.

Therefore, network performance is optimized at an infrastructure level while performance experienced by the user at a computing device using the network largely remains unknown. Essentially, a performance veil may exist at the interface between a computing device executing an application and the data communication network upon which it relies. As a result, suboptimal performance may occur at a computing device without recognition or resolution. Accordingly, degraded performance may be needlessly experienced by a user of the computing device since performance degrading factors go unidentified and adjustments to account for and/or correct for performance degrading factors are not identified, causing the degrading factors to go unmitigated. This informational deficit and lack of mitigation may foment consumer dissatisfaction with computing devices, applications, data communications networks, etc. and may also represent a missed business opportunity to provide increased performance with a particular computing device, a particular application, a particular wireless infrastructure provider, etc. by providing a means to identify and/or mitigate performance degrading factors.

In contrast, the techniques herein introduce a mechanism that leverages rich insight into computing device performance metrics and situational sensor data contemporaneous to those performance metrics to develop an actionable understanding of the relationship between device performance and situational influences. The techniques further introduce a mechanism of correlating these insights and then leveraging that correlated data to determine adjustments that can improve the operational performance of the computing device. As a result, performance degrading factors from the computing device perspective can be rapidly identified and mitigated and overall performance of the computing device, application execution at the computing device, and/or data communication by the computing device may be improved.

Illustratively, the techniques described herein may be performed by hardware, software, and/or firmware, such as in accordance with adjustment process 248, which may include computer executable instructions executed by the processor 220 (or independent processor of interfaces 210) to perform functions relating to the techniques described herein, e.g., in conjunction with corresponding processes of other devices in the computer network as described herein (e.g., on network agents, controllers, computing devices, servers, media nodes, etc.). In addition, the components herein may be implemented on a singular device or in a distributed manner, in which case the combination of executing devices can be viewed as their own singular "device" for purposes of executing the adjustment process 248.

Operationally and according to various embodiments, the techniques herein leverage operational performance metrics associated with one or more devices performing an operation and contemporaneous situational sensor data associated with the one or more devices performing the operation to determine adjustments that to increase the health of the operational performance metrics for a particular device. As a result, performance degrading factors from the computing device perspective can be identified and mitigated and overall performance of the computing device, application execution at the computing device, and/or data communication by the computing device may be improved.

Figure 3:
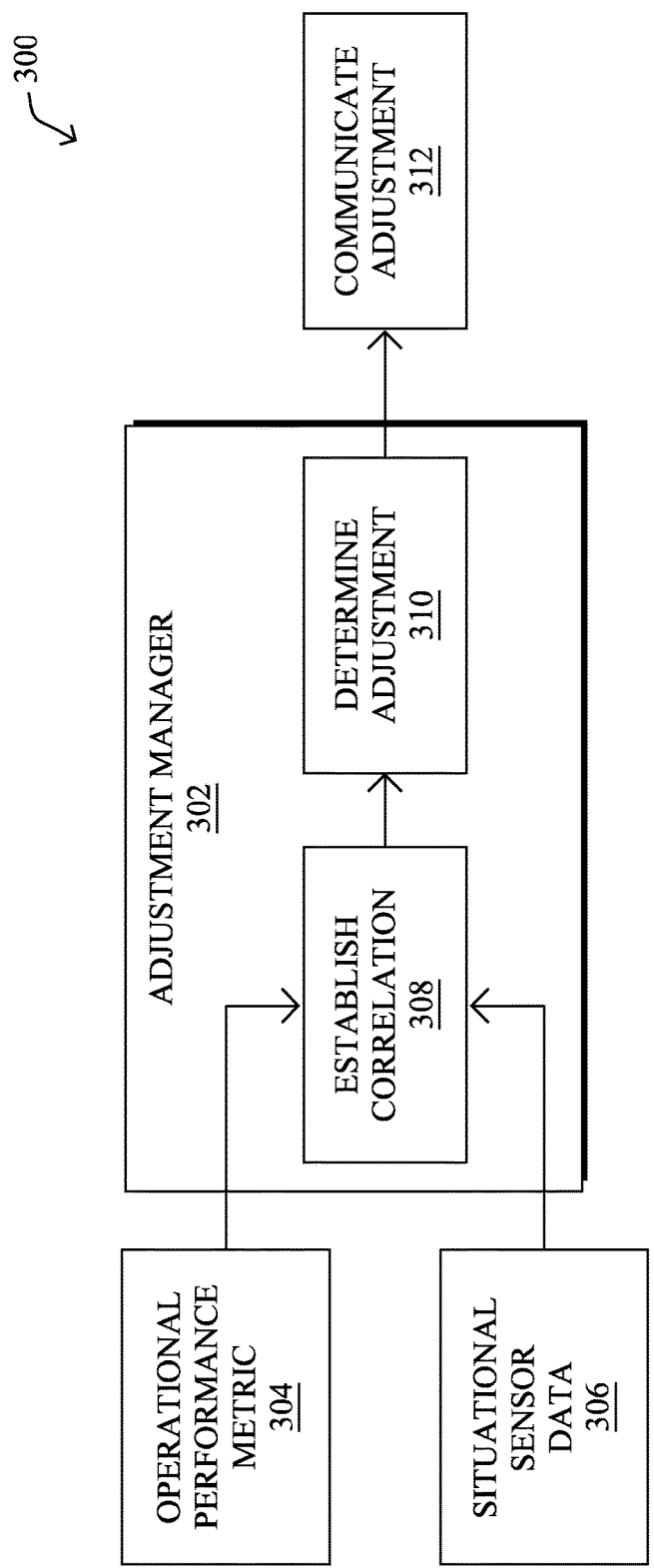
FIG. 3 illustrates an example architecture for device adjustment based on performance and sensor data.

Specifically, FIG. 3 illustrates an example architecture 300 for device adjustment based on performance and sensor data, according to various embodiments. Architecture 300 includes an adjustment manager 302. Adjustment manager 302 may include software and/or hardware to perform, for example, adjustment process 248 and/or other operations associated with device adjustment based on performance and sensor data.

Adjustment manager 302 may, for example, be a portion of a controller and analytics platform. In some instances, adjustment manager 302 may include an application and/or agent executing on a computing device that is the subject of the adjustment and/or may include software and/or agents executing on other computing devices (e.g., other computing devices in a same data communications network, cloud-based computing, a data communications network controller, a remote server, etc.). In some instances, adjustment manager 302 may be a distributed computing operation occurring over more than one computing device. As such, the inputs (e.g., operational performance metric 304, situational sensor data 306, etc.) to and outputs (e.g., adjustment 312, etc.) of the execution of adjustment manager 302 may be collected from and/or communicated to a same device where adjustment manager 302 is executing and/or one or more different devices from the one where adjustment manager 302 is executing.

In various embodiments, the operations of adjustment manager 302 may utilize any number of machine learning techniques, such as to classify the collected data, establish correspondences among the data, determine adjustments from the data, etc. as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering (e.g., establishing correspondences, etc.) is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

In various embodiments, adjustment manager 302, may obtain an operational performance metric 304. Operational performance metric 304 may include data and/or metrics related to operational performance of a computing device. For example, operational performance metric 304 may include data related to the topology and/or overall performance of the data communications network during execution of an operation by a computing device. Additionally, operational performance metric 304 may include data related to computational performance during an operation (e.g., executing an application) at a computing device. For example, operational performance metric 304 may include metrics of network features, wireless/physical layer parameters, load, average response time, error rate, percentage CPU busy, percentage of memory used, queue length, other usage metrics, settings data, wireless signal data, device architecture data, etc.

Operational performance metric 304 may also include one or more metrics that are application-specific and/or have particular relevance to an application whose operation is being executed at a computing device. For instance, operational performance metric 304 may include a stream quality metric for a video streaming application operation, a ping for an online gaming application, etc. In addition, these types of operational performance metric 304 may also include an indication of a type of operation or application associated each metric.

Broadly, operational performance metric 304 may be any metric of a computational and/or data communication operation executed by a computing device. An operational performance metric 304 may additionally include predicted metrics and/or demands associated with future operations at the computing device (e.g., demands associated with an upcoming or scheduled operation by an application executing at the computing device). For example, operational performance metric 304 may include an indication that a computing device will begin streaming a high-resolution video involving a data intensive stream.

Operational performance metric 304 may be obtained from one or more computing devices. For instance, ultimately, adjustment manager 302 may determine an adjustment 310 that is applicable to a particular computing device or devices (which may or may not be the same computing device executing adjustment manager 302). Operational performance metric 304 may be obtained from the particular computing device that is the subject of the adjustment determination.

Operational performance metric 304 may be additionally obtained from one or more other computing devices. These other computing devices may be computing devices on a same network as the particular computing device that is the subject of the adjustment determination and/or be computing device that are performing the same or similar operations as the particular computing device that is the subject of the adjustment.

For example, an operational performance metric 304 may be obtained for a particular type of operation or in association with a particular operation across a plurality of devices and/or time points. The plurality of devices may be devices communicatively coupled to the same data communication as network and/or in a same location as the computing device that is the subject of the adjustment determination. In this manner, a device type-specific, an application-specific, and/or an operation-specific performance profile may be built by adjustment manager 302 from the operational performance metric 304.

Adjustment manager 302 may obtain situational sensor data 306. Situational sensor data 306 may include sensor data that is reflective and/or indicative of situational attributes which may have influenced a corresponding operational performance metric. For example, situational sensor data may include as computing device settings data, computing device display orientation and/or settings data, gyroscope data, temperature data, humidity data, location data, computing device orientation data, data associated with how a computing device in being held, wireless signal data, data associated with wireless signal obstacles, camera orientation data, data associated with which band of the wireless data communication spectrum is utilized at the device, which wireless communication protocol is utilized by the device, which wireless technologies are available at the device, etc.

Situational sensor data 306 may be associated with a particular situation (e.g., a particular time, a particular operation, a particular application, a particular operational performance metric, etc.). For instance, situational sensor data 306 may be collected contemporaneous with an execution of an operation by a computing device and/or contemporaneous with the production and/or collection of operational performance metrics collected for that operation. Therefore, situational sensor data 306 and operational performance metric 304 may be two data perspectives on a same operation. One, operational performance metric 304, providing metrics of the computational and/or data communication performance and another, situational sensor data 306, providing metrics of situational attributes experienced contemporaneous with that performance. As such, these data perspectives may provide insight regarding the situation surrounding an operation and the performance consequences of that situation on performance of the operation. For instance, the operational performance metric 304 and situational sensor data 306 captured during an online gaming operation by a computing device may, as a pair, demonstrate that packet loss over a threshold amount is experienced when that computing device is communicating the data over a 2.4 GHz band.

Situational sensor data 306 may be obtained directly from the particular device that is the subject of the adjustment. In some examples, situational sensor data 306 may be collected from onboard sensors (e.g., cameras, temperature sensors, gyroscopes, light sensors, humidity sensors, microphones, signal sensors, accelerometers, GPS components, etc.) of that device. Additionally, or alternatively, situational sensor data 306 may be obtained from sensors of one or more other computing devices. These other computing devices may be computing devices on a same network as the computing device that is the subject of the adjustment determination. For instance, the other computing device may include IOT devices, sensor arrays, building control systems, manufacturing control systems, surveillance systems, APs, facilitating devices, etc.

In some instances, situational sensor data 306 may be obtained for a particular type of operation or in association with a particular operation across a plurality of devices and/or time points. In this manner, a device type-specific, an application-specific, and/or an operation-specific situational profile may be built by adjustment manager 302 from the situational sensor data 306.

In some instances, situational sensor data 306 may be collected from sensors in the same environment as the computing device whence the operational performance metric 304 is collected. For example, situational sensor data 306 may be collected from sensors integrated into an Internet of things (IoT) device, an access point (AP), etc. which located in the same environment (e.g., same building, same room, same geographic location, etc.) where the computing device is performing the operation. In some examples, an AP may provide a large spectrum of data including operational performance metric 304 and/or situational sensor data 306 to adjustment manager 302 for assurance purposes.

In various embodiments, adjustment manager 302 may determine a health of operational performance metric 304. In some instances, this may include determining a health score for operational performance metric 304. However, in other instances, the operational performance metric 304 itself may be the determination of the health of operational performance metric 304. For example, a comparison of a value of operational performance metric 304 to historical performance metrics, targeted performance metrics, threshold performance metrics, etc., may provide the indication of the health of operational performance metric 304. Unlike any previous performance metric-based health determinations, operational performance metric 304 may be a per-client, per-application, and/or per-operation health determination.

Adjustment manager 302 may perform a data fusion operation to establish a correlation 308 between operational performance metric 304 (e.g., the health and/or value of operational performance metric) and situational sensor data 306 captured contemporaneously therewith for one or more devices while performing an operation. For example, adjustment manager 302 may perform data fusion using multiple input sources (e.g., operational performance metric 304, situational sensor data 306, etc.) to establish a correlation 308 that may be used to assess the performance of a computing device with respect to a particular application and/or operation further informed by situational sensor data 306.

Again, adjustment manager 302 may additionally leverage operational performance metric 304 and/or situational sensor data 306 of other cooperating computing devices in performing the data fusion to establish correlation 308. In some examples, this may include augmenting correlations with operational performance metric 304 and/or situational sensor data 306 obtained through modules and/or drivers in an operating system of one or more cooperating computing devices other than the computing device that is the subject of the adjustment. Adjustment manager 302 may fuse this data with the data collected from and/or regarding the computing device that is the subject of the adjustment in order to establish a correlation 308 that includes a more comprehensive correlation between various operational performance metrics and situational attributes. As such, the correlation established by network manager 302 may provide a detailed and/or multi-computing device understanding of not only the health of operational performance metric 304 for an operation and the contemporaneous situational sensor data 306 associated with that health, but also a cross-device understanding of the relationship between operational performance metrics for the operation and the situational sensor data associated with those metrics.

Adjustment manager 302 may determine an adjustment 310 to a computing device. The adjustment may be targeted to increase the health of the operational performance metric 304 for a particular device. The adjustment may be determined based on the established correlation 308. For example, adjustment manager 302 may determine an adjustment to a particular device that is predicted to increase a performance metric for a particular computing device based on a correlation between that performance metric and its correlated situational sensor data. In various embodiments, this may translate to determining an adjustment that is predicted to modify situational attributes to increase the performance of an operation by a computing device based on relationships between situational sensor data and operational performance metrics.

For instance, adjustment manager 302 may determine, by referencing historical data for the particular computing device, that certain historical situational sensor data was correlated to a historical operational performance metric that is improved relative to the operational performance metric for the current operation. Therefore, adjustment manager 302 may determine that an adjustment should be made which is predicted to cause a change to the particular computing device, its operation, its settings and/or its environment that would cause its situation (e.g., device settings, display orientation, display settings, position, temperature, humidity, location, device orientation, how the device is being held, wireless signal, wireless communication settings, active/utilized wireless communication mechanisms, etc.) to more closely align with the situation sensed in the historical situational sensor data. Since that historical situational sensor data is correlated with an increased operational performance metric relative to the current operational performance metric, this adjustment may be expected increase the current operational performance metric of the particular device.

Likewise, adjustment manager 302 may determine, by referencing data for one or more other devices computing devices that were performing a same or similar operation, that certain situational sensor data at those devices was correlated to an operational performance metric that is improved relative to the operational performance metric for the current operation by the particular computing device. Adjustment manager 302 may determine that an adjustment should be made which is predicted to cause a change to the particular computing device, its operation, its settings and/or its environment that would cause its situation (e.g., device settings, display orientation, display settings, position, temperature, humidity, location, device orientation, how the device is being held, wireless signal, wireless communication settings, active/utilized wireless communication mechanisms, etc.) to more closely align with the situation reflected by the situational sensor data associated with the one or more other devices when the correlated increased operational performance metric was detected for those devices. Since the situational sensor data associated with the one or more other devices is correlated with an increased operational performance metric by those devices, this adjustment may be expected to increase the current operational performance metric of the particular device.

Adjustment manager 302 may also rely on models of relationships between situational sensor data and operational performance metric health to determine the adjustment. Adjustment manager 302 may develop these models, rely on existing models, and/or modify existing models of these relationships to determine adjustments. The models may include models of relationships between operational performance metrics and situational sensor data that are based on previous correlations established between historical operational performance metrics and their contemporaneous situational sensor data. The relationships established in these models may be used to predict adjustments that will cause a change to the particular computing device, its operation, its settings and/or its environment that would cause its situation (e.g., device settings, display orientation, display settings, position, temperature, humidity, location, device orientation, how the device is being held, wireless signal, wireless communication settings, active/utilized wireless communication mechanisms, etc.) to more closely align with a situation predicted by the model to produce an improved operational performance metric.

Adjustments to the particular computing device may include an adjustment to its device settings, display orientation, display settings, position, temperature, humidity, location, device orientation, how the device is being held, wireless signal, wireless communication settings, active/utilized wireless communication mechanisms, wireless communication band being utilized, camera angles, antenna angles, etc. For example, an adjustment may include an adjustment to an orientation of the particular computing device. The adjustment to the orientation may include an adjustment to which way the device is facing, an angle of tilt of a device about an axis, a distance of a device from the ground or an object, whether the object is in a landscape orientation or a portrait orientation, various angles or orientations therebetween, etc.

In another example, the adjustment may include an adjustment that impacts the network stack. For example, the adjustment may include an adjustment to switch the device between wireless communication protocols (switch from Wi-Fi to Bluetooth for wireless communications for the operation), to switch to using more than one wireless communication protocol (e.g., switch to using Wi-Fi and Bluetooth for wireless communications for the operation), to switch to another wireless communication band (e.g., switch from 2.4 GHz to 5 GHz), etc. Additionally, the adjustment may include an on-the-fly installation, by a network controller, of a new wireless communications network pathway for wireless communications for the operation. In some instances, the adjustment may include an adjustment to the position of an AP and/or its antennas to provide increased wireless signal coverage to a target area.

In various embodiments, adjustment manager 302 may communicate the adjustment 312. In some instances, adjustment manager 302 may communicate the adjustment responsive to a determination that the health of operational performance metric 304 has violated a predetermined health threshold for that performance metric. For example, when packet loss experienced by a particular computing device exceeds a threshold packet loss limit, the adjustment may then be determined and/or communicated.

The adjustment may be communicated to a receiving device. The receiving device may include the particular device, another device, a network controller, an adjustment facilitating device, etc. Therefore, the receiving device may be the same device that is being adjusted and/or a different device than is being adjusted. Additionally, the receiving device may be the same device where adjustment manager 302 is executing and/or a different device than the device where adjustment manager 302 is executing.

The adjustment may be communicated as a hint or other instruction. For example, the adjustment may be communicated as an instruction to a user (e.g., a human being) of a computing device prompting the user to perform the determined adjustment and/or instructing the user as to how that adjustment should be performed. The instruction may be communicated as a text, audio, graphic, lighting pattern, etc. communication. The instruction may be displayed and/or otherwise communicated to the user by the receiving device. In some examples, the instruction may include haptic feedback to communicate the adjustment to a user.

In various embodiments, the instruction may be a machine-readable prompt or command to the receiving device to perform the adjustment. For example, the instruction may be a machine-readable command directly to the receiving device to execute the adjustment. In some instances, the instruction may cause the receiving device to apply the adjustment to the particular computing device being adjusted and/or to a device (e.g., IOT device, environmental control device, AP, another computing device, etc.) associated with the particular computing device being adjusted. In some examples, the instruction may be an instruction to an automated positioning component that is managing the orientation of a device. For example, the instruction may include repositioning instructions executable by a robotic arm or other robotic positioning device to cause a specified repositioning of the particular computing device. In a specific example, the robotic positioning device may be a robotic smartphone positioning stand located in an automobile or other transportation vehicle. In another specific example, the robotic positioning device may be a computing device and/or manufacturing component positioning stand located in a manufacturing area.

Figure 4:
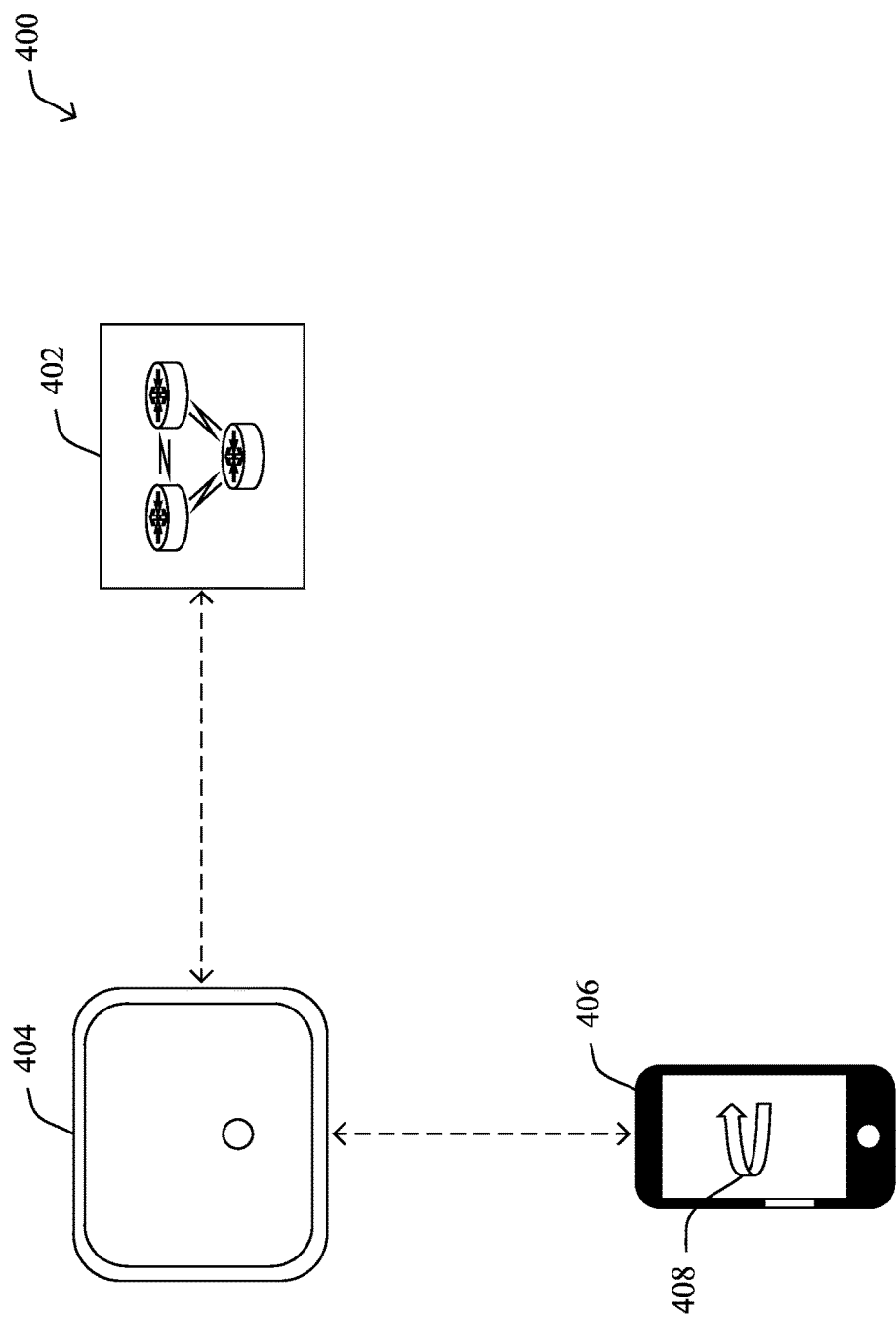
FIG. 4 illustrates an example system for device adjustment based on performance and sensor data.

FIG. 4 illustrates an example system 400 for device adjustment based on performance and sensor data, according to various embodiments. System 400 may include network controller 402. Network controller 402 may include network control software and/or a network management dashboard executing on a physical appliance (e.g., computing device, controller hardware, server, etc.) that is connected to a data communications network. Network controller 402 may manage network design and operation, device management for network connected devices and infrastructure, network policy definition and enforcement, software/service provisioning, telemetry data-based assurance, etc. for the data communications network. Additionally, network controller 402 may be configured to perform device adjustment based on performance and sensor data. For instance, network controller 402 may include adjustment manager 302 and/or other modules to execute adjustment process 248.

Network controller 402 may be communicatively coupled to AP 404. AP 404 may include data communications network hardware and/or software that facilitates a connection between one or more client devices (e.g., client device 406) and the data communication network. For example, AP 404 may include a wireless signal communication device for sending and receiving data to/from client device 406 and facilitating the communication of data to/from other devices on the data communications network. In some instances, AP 404 may be a smart AP which may include a suite of environmental sensors and/or threat detection monitors.

AP 404 may collect, generate, and/or communicate real-time analytics and/or telemetry data. For example, AP 404 may collect and/or generate real-time analytics and/or telemetry data associated with client device 406. In some examples, this may include operational performance metrics and/or situational sensor data associated with computational operations and/or data communications by client device 406.

AP 404 may communicate such data to network controller 402. In some instances, this communication may occur over a direct link between AP 404 and network controller 402 via a gRPC channel. For example, AP 404 may provide, via this direct communication link, packet capture data, AP and client statistics, spectrum data, situational sensor data, operational performance metrics, etc. associated with an operation or application at client device 406 to network controller 402.

Network controller 402 may obtain operational performance metrics associated with one or more devices (e.g., client device 406) performing an operation for an application executing at the one or more devices and contemporaneous situational sensor data associated with the one or more devices performing the operation. This data may provide network controller 402 with capability information related to the one or more devices. For example, network controller may use this data to determine different wireless communication technologies available at the one or more devices, visual technology such as cameras on augmented APs (e.g., AP 404) to provide visual monitoring of the one or more devices, etc. Network controller 402 may obtain this data from AP 404.

Network controller 402 may utilize this data to extend a health indication to be a per-client-application measure. For example, the network controller 402 may accomplish this by establishing a correlation between the health of the operational performance metrics and the contemporaneous situational sensor data for the one or more devices while performing an application operation at a client.

Network controller 402 may perform data-fusion on the performance metrics associated with one or more devices performing the operation and the contemporaneous situational sensor data associated with the one or more devices performing the operation. The data fusion may include correlating data from other cooperating client devices, collected through modules and/or driver in their operating systems. For example, data such as sensor data (gyroscope, temperature, humidity, location, etc.) and/or network or operating system statistics (e.g., queue length/usage, CPU/Memory utilization, etc.) may be provided to network controller 402 as additional details to be used in the data fusion operations.

The fusion operations may allow network controller 402 to establish a correlation linking performance metrics with contemporaneous situational sensor data in a manner that provides network controller 402 with insight into which situations and/or attributes of a situation tend to increase performance metrics in one or more devices performing the operation.

Network controller 402 may, upon performing the data fusion to establish the aforementioned correlations, determine an adjustment to increase the health of the operational performance metrics for a particular device of the one or more devices based on the correlation. The adjustment may be determined by comparison of the current contemporaneous situational sensor data to historical situations and/or and historical contemporaneous situational sensor data that is correlated with increased historical operational performance metrics as compared to the current operational performance metrics for the device.

The adjustment may include an action predicted by the network controller 402 to improve the performance of the client device 406. This adjustment may be specific to the client device 406, an application executing at the client device 406, a particular operation of that application, and such. The client device 406, an application executing at the client device 406, a particular operation of that application may be determined by network controller 402 from the data obtained by network controller 402 via AP 404 (e.g., from packet captures, etc.).

The adjustment may, in some instances, be communicated to a receiving device such as network controller 402, AP 404, client device 406, and/or some other facilitating device as an instruction to perform the adjustment. The instruction may be configured for presentation to a user, direct execution by a device, etc. In some instances, the adjustment may be determined and/or communicated responsive to an operational performance metric for client device 406 violating a threshold level for that metric.

The adjustment may be an action to be applied to a network stack. For instance, the adjustment may include a suggestion to "use Wi-Fi and Bluetooth," "switch to another wireless signal band," etc. and/or a command executable to automatically effectuate such an adjustment. In another example, the adjustment may include triggering network controller 402 to perform an on-the-fly network path installation for data communication by client device 406.

In further examples, the adjustment may include an instruction to a human user of the receiving device to reorient the particular device to achieve better wireless communication. For example, the adjustment may include an instruction such as a hint to the user for an orientation adjustment like "please tilt device to left to get better wireless signal coverage if you want better quality in the upcoming battle-section of the movie you're streaming."

In some examples, the adjustment may include an instruction to a human user to "reposition your grip on the device, as your current grip may be interfering with wireless communication." In other examples, the adjustment may include an instruction to a human user to "please move device 5 cm to the right."

In still further examples, the adjustment may include an instruction to reposition an AP, such as AP 404, to provide better wireless signal coverage to a targeted area or computing device. Additionally, the adjustment may include an instruction to move the particular device that is the subject of the adjustment itself to provide better wireless signal coverage to a target area (e.g., when the particular device is an AP). Additionally, the adjustment may include an instruction to adjust a camera angle of a camera component of client device 406 to provide better visual coverage of a target area and/or to provide better alignment with virtual reality content, etc. (e.g., when client device 406 is a virtual reality delivery device).

In further examples, the adjustment may include an instruction to an automated positioning component (e.g., robotic arm, robotic stand, etc.) to tilt the device to a particular orientation. For instance, the adjustment may include a positional adjustment instruction to an automated positioning device in an automobile that manages the position of client device 406 while a driving assistance and/or guidance application executes on the client device 406.

The adjustment instruction may be communicated by the receiving device to a human user and/or to a control component of client device 406. In some examples, the instruction may be provided as a visual instruction 408 including text, graphics, symbols, lighting patterns, etc. that communicate the suggested adjustment to the user. While visual instruction 408 is illustrated on client device 406, it should be appreciated that it may be displayed on a device other than the client device 406 instead of and/or in addition to the client device 406.

In some examples, the instruction may be an audio communication to the user. In still further examples, the instruction may be communicated as haptic feedback which may be utilized to steer the adjustment.

Additionally, the adjustment instructions can be commands and/or other machine-readable instructions intended to be executed directly by the receiving device. In this manner, the instructions may be automatically executed (e.g., the client device 406 may be automatically adjusted) via the receiving device rather than by involving human intervention.

Subsequent to communicating the adjustment construction, network controller 402 may continue to obtain operational performance metrics and/or situational sensor data associated with the adjusted device performing the operation. Network controller 402 may monitor this data to determine whether the adjustment was performed, whether the adjustment achieved the increase in operational performance metrics, whether additional adjustments are needed, what those additional adjustments are, etc. In addition, network controller 402 may use the data to refine correlations and/or other models of the relationship between particular operational performance metrics and particular situational sensor data and/or to refine future determinations of adjustments that will achieve a targeted increase of an operational performance metric.

Figure 5:
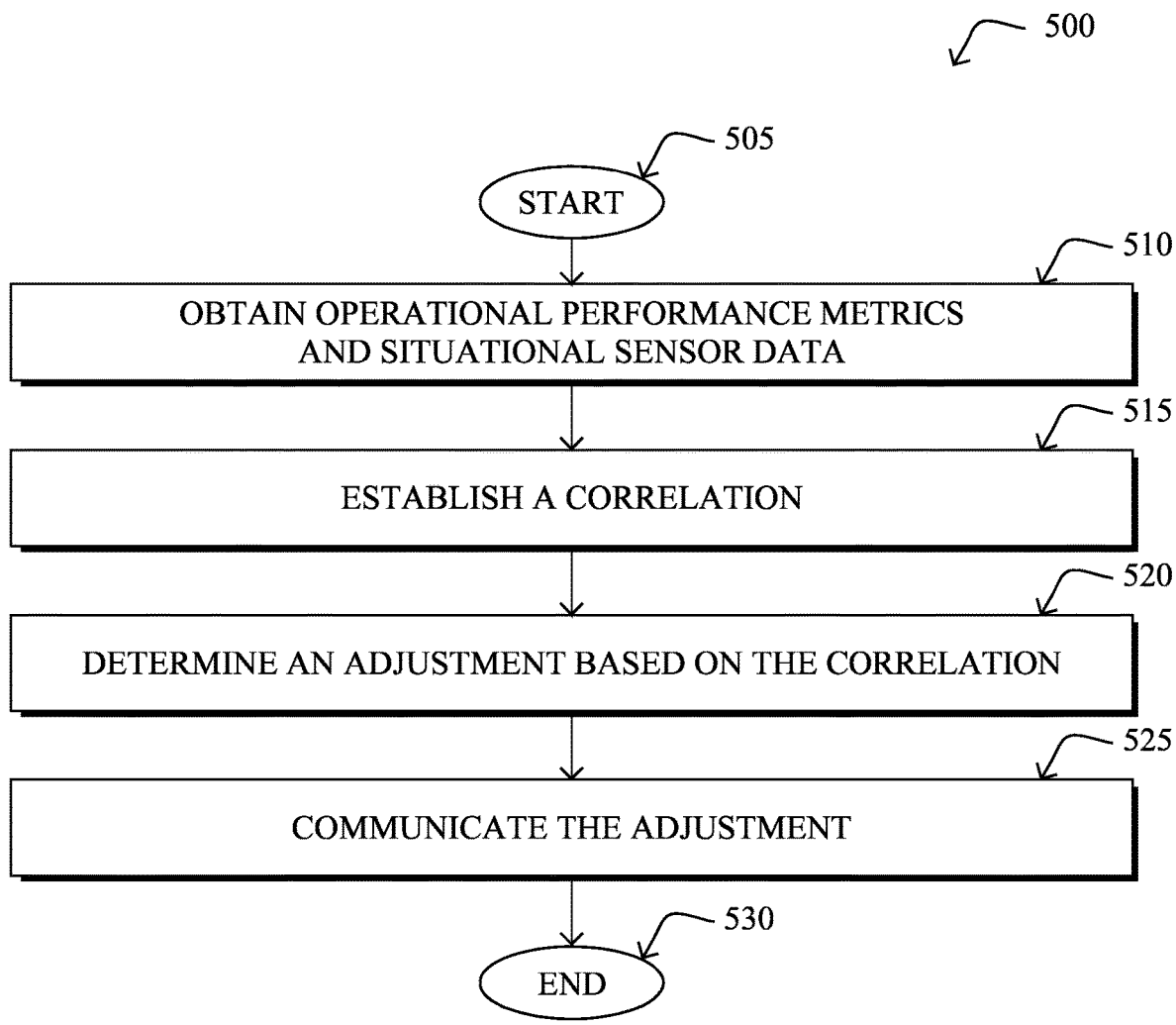
FIG. 5 illustrates an example simplified procedure for device adjustment based on performance and sensor data in accordance with one or more embodiments described herein.

In closing, FIG. 5 illustrates an example simplified procedure for device adjustment based on performance and sensor data in accordance with one or more embodiments described herein, particularly from the perspective of either an edge device, a client device, a controller, etc. For example, a non-generic, specifically configured device (e.g., device 200) may perform procedure 500 by executing stored instructions (e.g., process 248, such as an adjustment process). The procedure 500 may start at step 505, and continues to step 510, where, as described in greater detail above, the procedure includes obtaining, by a process, operational performance metrics associated with one or more devices performing an operation and contemporaneous situational sensor data associated with the one or more devices performing the operation.

At step 515, the procedure 500 may include establishing, by the process, a correlation between a health of the operational performance metrics and the contemporaneous situational sensor data for the one or more devices while performing the operation. Establishing a correlation may include determining relationships between particular situational sensor data of one or more devices performing an operation and various levels of operational performance metrics associated with those one or more devices performing the operation, such that predictions can be made about how adjustments to a particular device's environment, settings, operation, data communication configuration, orientation, location, etc. (as determined from the situational sensor data) may improve a health operational performance metric (e.g., increase, decrease, modify, etc. in a manner that causes improved performance of the operation) for the particular device.

At step 520, the procedure 500 may include determining, by the process, an adjustment to increase the health of the operational performance metrics for a particular device of the one or more devices based on the correlation. In some instances, the particular device may include a mobile computing device, smartphone, a virtual reality delivery device, an AP, etc.

The adjustment may include an adjustment to an orientation of the particular device. In addition, the adjustment may include a modification to network communication by the one or more devices. For example, the adjustment may include a modification to a topology of a data communications network by a network controller and/or a modification to wireless communication protocols and/or bands utilized by the particular device for data communications. In other examples, the adjustment may also include a reorientation of a virtual reality delivery device to align a display of virtual content.

At step 525, the procedure 500 may include communicating, by the process, the adjustment to a receiving device to facilitate adjusting of the particular device. The adjustment may be communicated to the receiving device responsive to the health of the operational performance metrics violating a threshold health metric.

Communicating the adjustment may include providing an instruction including haptic feedback to accomplish the adjustment. Additionally, the receiving device may include a facilitating device. For example, the receiving device may include an automated positioning component managing an orientation of the particular device.

The simplified procedure 500 may then end in step 530, notably with the ability to continue obtaining operational performance metrics and contemporaneous situational sensor data to further establish and adjust correlations and make further determinations and communications of adjustments to increase the health of the same or other operational performance metrics. Other steps may also be included generally within procedure 500.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for device adjustments based on performance and sensor data. In particular, the techniques herein introduce a mechanism that establishes a per-client-application performance measurement. For example, by monitoring and fusing network features, wireless communication parameters, physical parameters, location data, orientation data, capability data, etc. the health of per-device-application performance can be monitored and correlated to various situational sensor data. These data and correlations allow for the rapid identification of performance issues at a device along with the ability to identify remediation actions to improve performance based on the correlations. These techniques may operate like a closed loop that can be used to monitor performance at a device, correlate the performance with sensor data, identify performance identify adjustments to address performance issues at the device, communicate the adjustments, and/or monitor the effectiveness of those adjustments. As a result, performance degrading situations can be identified and mitigated and overall performance of a computing device, application execution at the computing device, and/or data communication by the computing device may be improved.

In still further embodiments of the techniques herein, a business impact of the device adjustments based on performance and sensor data can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments, at other times, on other devices) remain unaffected. The techniques herein, therefore, can correlate the device adjustments based on performance and sensor data with various business transactions in order to better understand the effect on the business transactions, accordingly.

Illustratively, the techniques described herein may be performed by hardware, software, and/or firmware, such as in accordance with the illustrative adjustment process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: obtaining, by a process, operational performance metrics associated with one or more devices performing an operation and contemporaneous situational sensor data associated with the one or more devices performing the operation; establishing, by the process, a correlation between a health of the operational performance metrics and the contemporaneous situational sensor data for the one or more devices while performing the operation; determining, by the process, an adjustment to increase the health of the operational performance metrics for a particular device of the one or more devices based on the correlation; and communicating, by the process, the adjustment to a receiving device to facilitate adjusting of the particular device.

In one embodiment, the process is executed on a network controller. In another embodiment, the process is executed on the particular device. In a further embodiment, the adjustment includes an adjustment to an orientation of the particular device. In another embodiment, the adjustment includes a modification to network communication by the one or more devices.

In one embodiment, the particular device is an access point. In another embodiment, the particular device is a virtual reality delivery device, and wherein the adjustment is a reorientation of the virtual reality delivery device to align a display of virtual content. In a further embodiment, the adjustment is communicated to the receiving device responsive to the health of the operational performance metrics violating a threshold health metric. In an additional embodiment, communicating the adjustment includes providing an instruction including haptic feedback to accomplish the adjustment. In another embodiment, the receiving device is an automated positioning component managing an orientation of the particular device.

According to the embodiments herein, an illustrative tangible, non-transitory, computer-readable medium herein may have computer-executable instructions stored thereon that, when executed by a processor on a computer, may cause the computer to perform a method comprising: obtaining, by a process, operational performance metrics associated with one or more devices performing an operation and contemporaneous situational sensor data associated with the one or more devices performing the operation; establishing, by the process, a correlation between a health of the operational performance metrics and the contemporaneous situational sensor data for the one or more devices while performing the operation; determining, by the process, an adjustment to increase the health of the operational performance metrics for a particular device of the one or more devices based on the correlation; and communicating, by the process, the adjustment to a receiving device to facilitate adjusting of the particular device.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: obtain operational performance metrics associated with one or more devices performing an operation and contemporaneous situational sensor data associated with the one or more devices performing the operation; establish a correlation between a health of the operational performance metrics and the contemporaneous situational sensor data for the one or more devices while performing the operation; determine an adjustment to increase the health of the operational performance metrics for a particular device of the one or more devices based on the correlation; and communicate the adjustment to a receiving device to facilitate adjusting of the particular device.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    obtaining, by a process, operational performance metrics associated with one or more devices performing an operation and contemporaneous situational sensor data associated with the one or more devices performing the operation;
    establishing, by the process, a correlation based on data fusion between a health of the operational performance metrics and the contemporaneous situational sensor data for the one or more devices while performing the operation;
    determining, by the process, an adjustment to increase the health of the operational performance metrics for a particular device of the one or more devices based on the correlation; and
    communicating, by the process, the adjustment to a receiving device to facilitate adjusting of the particular device.

2. The method as in claim 1, wherein the process is executed on a network controller.

3. The method as in claim 1, wherein the process is executed on the particular device.

4. The method as in claim 1, wherein the adjustment includes an adjustment to an orientation of the particular device.

5. The method as in claim 1, wherein the adjustment includes a modification to network communication by the one or more devices.

6. The method as in claim 1, wherein the particular device is an access point.

7. The method as in claim 1, wherein the particular device is a virtual reality delivery device, and wherein the adjustment is a reorientation of the virtual reality delivery device to align a display of virtual content.

8. The method as in claim 1, wherein the adjustment is communicated to the receiving device responsive to the health of the operational performance metrics violating a threshold health metric.

9. The method as in claim 1, wherein communicating the adjustment includes providing an instruction including haptic feedback to accomplish the adjustment.

10. The method as in claim 1, wherein the receiving device is an automated positioning component managing an orientation of the particular device.

11. A tangible, non-transitory, computer-readable medium having computer-executable instructions stored thereon that, when executed by a processor on a computer, cause the computer to perform a method comprising:
    obtaining, by a process, operational performance metrics associated with one or more devices performing an operation and contemporaneous situational sensor data associated with the one or more devices performing the operation;
    establishing, by the process, a correlation based on data fusion between a health of the operational performance metrics and the contemporaneous situational sensor data for the one or more devices while performing the operation;
    determining, by the process, an adjustment to increase the health of the operational performance metrics for a particular device of the one or more devices based on the correlation; and
    communicating, by the process, the adjustment to a receiving device to facilitate adjusting of the particular device.

12. The tangible, non-transitory, computer-readable medium as in claim 11, wherein the process is executed on a network controller.

13. The tangible, non-transitory, computer-readable medium as in claim 11, wherein the process is executed on the particular device.

14. The tangible, non-transitory, computer-readable medium as in claim 11, wherein the adjustment includes an adjustment to an orientation of the particular device.

15. The tangible, non-transitory, computer-readable medium as in claim 11, a modification to network communication by the one or more devices.

16. The tangible, non-transitory, computer-readable medium as in claim 11, wherein the particular device is an access point.

17. The tangible, non-transitory, computer-readable medium as in claim 11, wherein the adjustment is communicated to the receiving device responsive to the health of the operational performance metrics violating a threshold health metric.

18. The tangible, non-transitory, computer-readable medium as in claim 11, wherein communicating the adjustment includes providing an instruction including haptic feedback to accomplish the adjustment.

19. The tangible, non-transitory, computer-readable medium as in claim 11, wherein the receiving device is an automated positioning component managing an orientation of the particular device.

20. An apparatus, comprising:
    one or more network interfaces to communicate with a network;

a processor coupled to the one or more network interfaces and configured to execute one or more processes; and a memory configured to store a process that is executable by the processor, the process, when executed, configured to:

obtain operational performance metrics associated with one or more devices performing an operation and contemporaneous situational sensor data associated with the one or more devices performing the operation;

establish a correlation based on data fusion between a health of the operational performance metrics and the contemporaneous situational sensor data for the one or more devices while performing the operation;

determine an adjustment to increase the health of the operational performance metrics for a particular device of the one or more devices based on the correlation; and communicate the adjustment to a receiving device to facilitate adjusting of the particular device.

* * * * *